US006989621B2

(12) United States Patent
Kaminski et al.

(10) Patent No.: US 6,989,621 B2
(45) Date of Patent: Jan. 24, 2006

(54) MODULE WINDING SYSTEM FOR ELECTRICAL MACHINES AND METHODS OF ELECTRICAL CONNECTION

(75) Inventors: Christopher Anthony Kaminski, Schenectady, NY (US); Robert John Nygard, Saratoga Springs, NY (US); Nancy Lee Nichols, Niskayuna, NY (US); Cynthia Vonk Nous, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/806,171

(22) Filed: Mar. 23, 2004

(65) Prior Publication Data

US 2005/0212379 A1   Sep. 29, 2005

(51) Int. Cl.
  *H02K 3/46* (2006.01)
(52) U.S. Cl. ................. 310/261; 310/208; 310/214
(58) Field of Classification Search ............. 310/208, 310/214, 261–262
  See application file for complete search history.

(56) References Cited

U.S. PATENT DOCUMENTS

| | | | |
|---|---|---|---|
| 4,363,982 A | 12/1982 | Kaminski | |
| 4,543,503 A | 9/1985 | Kaminski et al. | |
| 4,667,125 A | 5/1987 | Kaminski et al. | |
| 4,709,177 A | 11/1987 | Kaminski | |
| 4,814,655 A | 3/1989 | Kaminski | |
| 4,900,964 A * | 2/1990 | Ying et al. | ............. 310/215 |
| 5,065,064 A | 11/1991 | Kaminski | |
| 5,281,877 A | 1/1994 | Kazmierczak et al. | |
| 5,358,432 A | 10/1994 | Shih et al. | |
| 5,886,434 A | 3/1999 | Nygard | |
| 5,929,550 A | 7/1999 | Kaminski et al. | |
| 5,986,380 A | 11/1999 | Kaminski et al. | |
| 6,081,178 A | 6/2000 | Wang et al. | |
| 6,181,228 B1 | 1/2001 | Laskaris et al. | |
| 6,194,807 B1 | 2/2001 | Kaminski et al. | |
| 6,198,371 B1 | 3/2001 | Laskaris et al. | |
| 6,201,462 B1 | 3/2001 | Laskaris et al. | |
| 6,239,527 B1 | 5/2001 | Kaminski et al. | |
| 6,246,308 B1 | 6/2001 | Laskaris et al. | |
| 6,291,919 B1 | 9/2001 | Ganti et al. | |
| 6,313,561 B1 | 11/2001 | Nygard et al. | |
| 6,339,268 B1 | 1/2002 | Kaminski et al. | |
| 6,346,753 B1 | 2/2002 | Jarczynski et al. | |
| 6,369,482 B1 | 4/2002 | Rink, Jr. et al. | |
| 6,415,613 B1 | 7/2002 | Ackermann et al. | |
| 6,437,476 B1 | 8/2002 | Nygard et al. | |
| 6,438,969 B1 | 8/2002 | Laskaris et al. | |
| 6,442,949 B1 | 9/2002 | Laskaris et al. | |
| 6,448,686 B1 | 9/2002 | Dawson et al. | |
| 6,495,942 B1 | 12/2002 | Kaminski et al. | |
| 6,590,311 B1 * | 7/2003 | Wang et al. | ............. 310/261 |
| 6,629,356 B2 * | 10/2003 | Wang et al. | ............. 29/596 |
| 6,703,733 B1 * | 3/2004 | Wang et al. | ............. 310/85 |
| 6,710,497 B2 * | 3/2004 | Wang et al. | ............. 310/208 |

* cited by examiner

*Primary Examiner*—Burton Mullins
(74) *Attorney, Agent, or Firm*—Nixon & Vanderhye P.C.

(57) ABSTRACT

Winding modules are secured about pole regions of a rotor body with assembly being accomplished in radial directions. Plug-in type electrical connectors oriented parallel to the direction of assembly facilitate both mechanical and electrical connection between the rotor body and the modules with one another. The modules include filler strips having tongue-and-groove or dovetail connections with adjacent pairs of the support elements of the support brace.

7 Claims, 5 Drawing Sheets

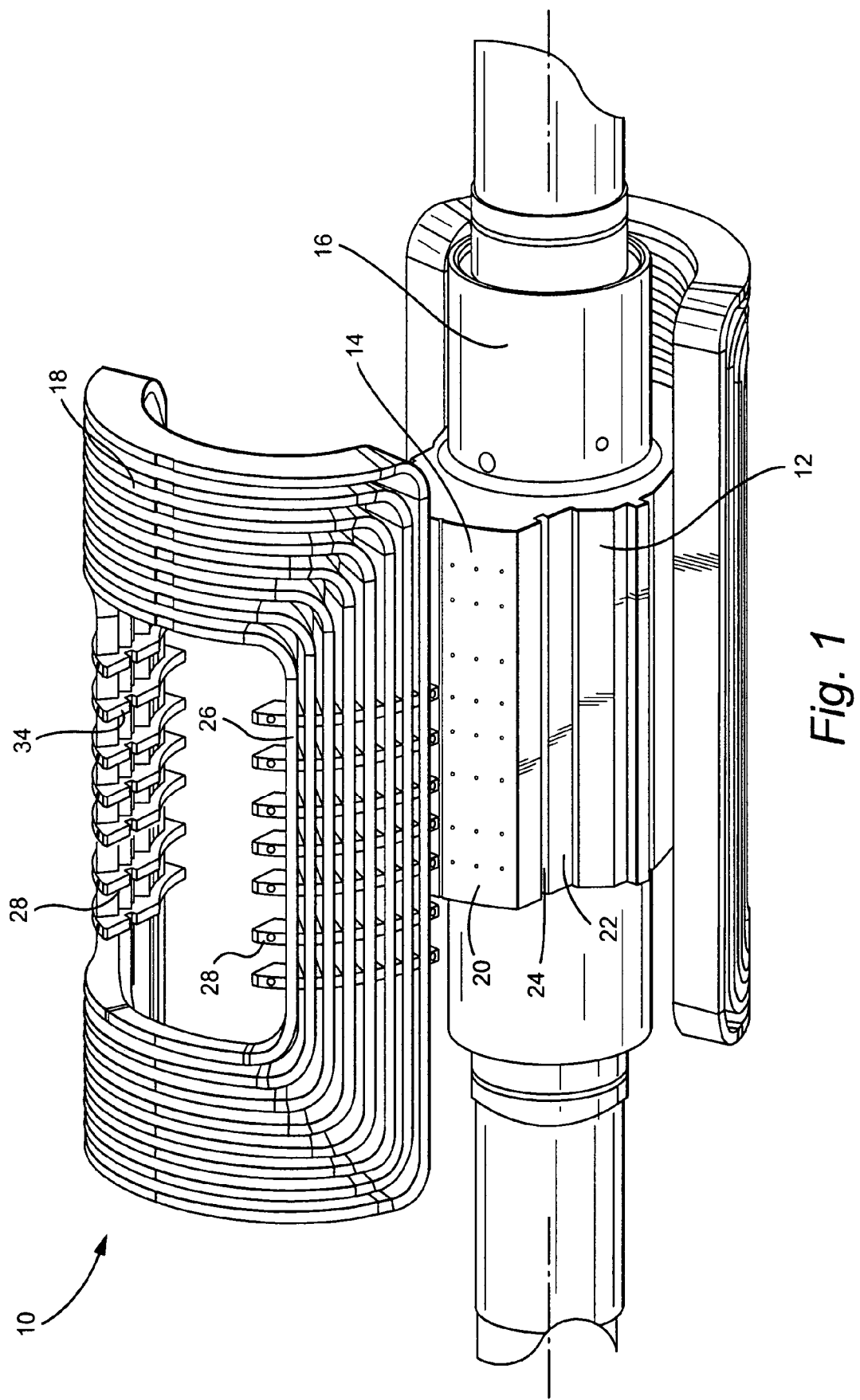

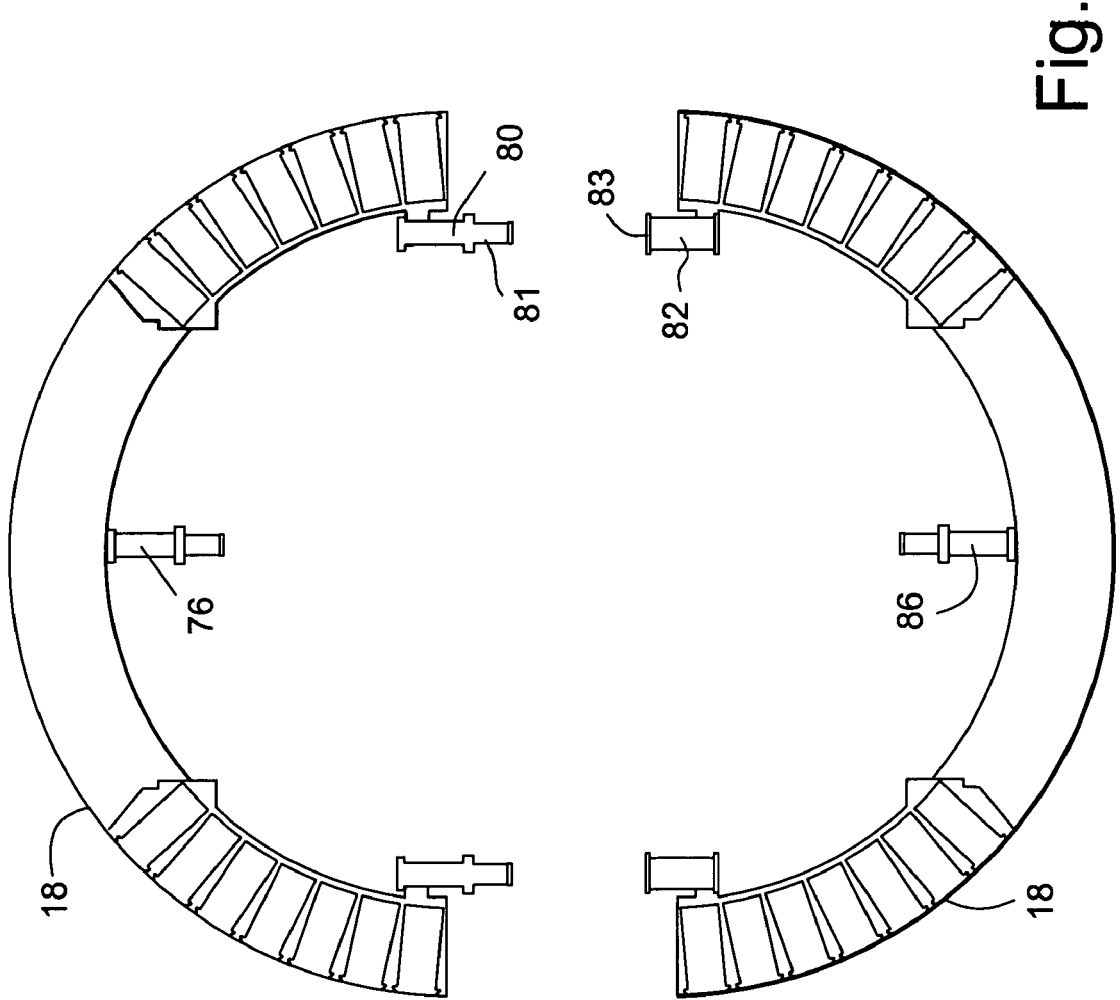

MODULE WINDING SYSTEM FOR ELECTRICAL MACHINES AND METHODS OF ELECTRICAL CONNECTION

BACKGROUND OF THE INVENTION

The present invention relates to a rotor of an electrical machine and particularly to winding modules secured to a rotor body with filler strips maintaining the windings in place. The present invention also relates to the electrical connections between the modules and the rotor body and between the modules per se and to methods of effecting the electrical connections during assembly.

Conventional electrical machines have rotors that support field windings. These rotors typically have rotor cores with axial slots that receive each turn of the field windings. Wedges are typically used to close the rotor slots to restrain the windings against the centrifugal forces that arise as the rotor spins. There are certain disadvantages to this type of construction, e.g., assembly of the windings in the rotor is inefficient. Another type of electrical machine has been proposed and constructed which eliminates many of the disadvantages of those prior conventional electrical machines.

In such newer constructions, preformed modular field windings are installed about the rotor. The rotor has poles with defined pole faces and preferably parallel sides adjacent to the pole faces. A winding module fits over the parallel sides of the poles. The modular field windings include winding support braces axially spaced from one another for holding the winding turns. The winding braces include support elements circumferentially spaced from one another along the long side of the windings and each brace includes a plurality of windings between support elements of the winding support brace. The braces collectively hold a nested assembly of windings and the braces and windings are secured to the rotor by a locking mechanism. It will be appreciated that the rotor may support at least a pair of modular windings along opposite poles. Also, the winding braces are fitted to each modular winding prior to its assembly with the rotor.

BRIEF DESCRIPTION OF THE INVENTION

In accordance with an aspect of the present invention, the winding support braces include filler strips in line with and radially outboard of each coil and spanning between the support elements of the support braces. The filler strips provide adequate electrical creep distance between the field windings and the containment structure. The filler strips and support elements of the winding braces have interlocking features which align the radial outer surface of the filler strips with the radial outer surfaces of the support elements of the winding braces such that a continuous arcuate outer surface of the rotor is formed in the region of the module. The interlocking feature between the filler strips and the support elements may comprise a tongue-and-groove connection or a dovetail connection. In an electrical sense, the filler strips provide a longer electrical creepage path between the winding and electrically conductive components at ground potential, such as an amortisseur circuit. Additionally, the filler strips secure the coils in the module during assembly of the modular winding over the rotor body.

In another aspect of the present invention, reliable electrical connections are provided between a main lead input to the rotor and a first module and connections between the first module and the second module in a manner which facilitates securing the winding modules on the rotor body without additional brazing of the leads of the rotor and modules. Particularly, plug-in connections between the rotor body and winding modules and the winding modules to one another enable the winding modules to be assembled onto the rotor body without additional brazing at the pole connection end of the winding. This type of plug-in connection is also oriented parallel to the direction of motion of assembly of the modules onto the rotor body which facilitates the plug-in connection and overall ease of assembly.

In a preferred embodiment of the present invention, there is provided A multi-pole electric machine rotor comprising a rotor body having defined pole regions with pole faces and sides adjacent the pole faces, at least a pair of prefabricated winding modules each having sequentially abutting field windings, the modules being fitted over the sides of the pole regions, each the module including a winding support having generally radially extending circumferentially spaced support elements defining slots therebetween for receiving the field windings, filler strips radially outwardly of the windings in each the slot and secured between radially outer ends of adjacent pairs of the support elements, and the rotor body has a flange projecting perpendicular to a center line of the poles, each the module having a stop for engaging against the flange to position the modules about the rotor body.

In a further preferred embodiment according to the present invention, there is provided a multi-pole electric machine rotor comprising a rotor body having defined pole regions with pole faces and sides adjacent the pole faces, at least a pair of prefabricated winding modules each having sequentially abutting field windings, the modules being fitted over the sides of the pole regions with the field windings extending continuously in multiple coils about the sides and ends of the pole regions, a first electrical connector carried by the rotor body and a first mating electrical connector carried by an end coil of the windings of one of the modules for electrically connecting a main lead external of the rotor body and the one module, a second electrical connector carried by the rotor body, a second electrical connector carried by an opposite end coil of the windings of the one module and a first mating electrical connector carried by an end coil of the windings of a second of the modules for electrically connecting the first and second modules one to the other and a second electrical connector carried by an opposite end coil of the windings of the second module for electrical connection with the second electrical connector carried by the rotor body completing a circuit through the modules and rotor.

In a further preferred embodiment of the present invention, there is provided a method of electrically connecting prefabricated winding modules and a multi-pole electrical machine rotor comprising the steps of (a) assembling the modules onto the rotor by displacing the modules in respective radial inward directions onto the rotor, (b) electrically connecting the modules one to the other in response to displacement of the modules in the respective radial inward directions onto the rotor to form a series electrical connection between the modules and (c) electrically connecting first and last modules of the series connected modules with respective electrical connectors carried by the rotor in response to displacement of the modules in the respective radial inward directions onto the rotor.

In a further preferred embodiment according to the present invention, there is provided a method of electrically connecting first and second prefabricated winding modules and a multi-pole electric machine rotor and electrically connecting the modules with one another during assembly of the modules onto the rotor in a generally radial direction comprising the steps of (a) providing first and second electrical connectors on the rotor oriented in a direction generally parallel to the direction of assembly of the modules onto the rotor, (b) providing first and second electrical connectors on the respective first and second modules oriented in directions generally parallel to the respective directions of assembly of the modules onto the rotor for mating with the first and second electrical connectors on the rotor, respectively, (c) providing third and fourth electrical connectors on the respective first and second modules in directions generally parallel to the respective directions of assembly of the modules onto the rotor for mating with one another and (d) assembling the modules in respective radial directions onto the rotor to electrically connect the first and second electrical connectors on the rotor and the mating first and second electrical connectors on the first and second modules, respectively, and to electrically connect the third and fourth electrical connectors on the first and second modules with one another.

BRIEF DESCRIPTION OF THE DRAWINGS

FIG. 1 is an exploded perspective view illustrating modular windings for reception about a pole face of a rotor;

FIG. 8 is an end view illustrating plug-in type electrical connectors between the modules.

DETAILED DESCRIPTION OF THE INVENTION

Figure 3:
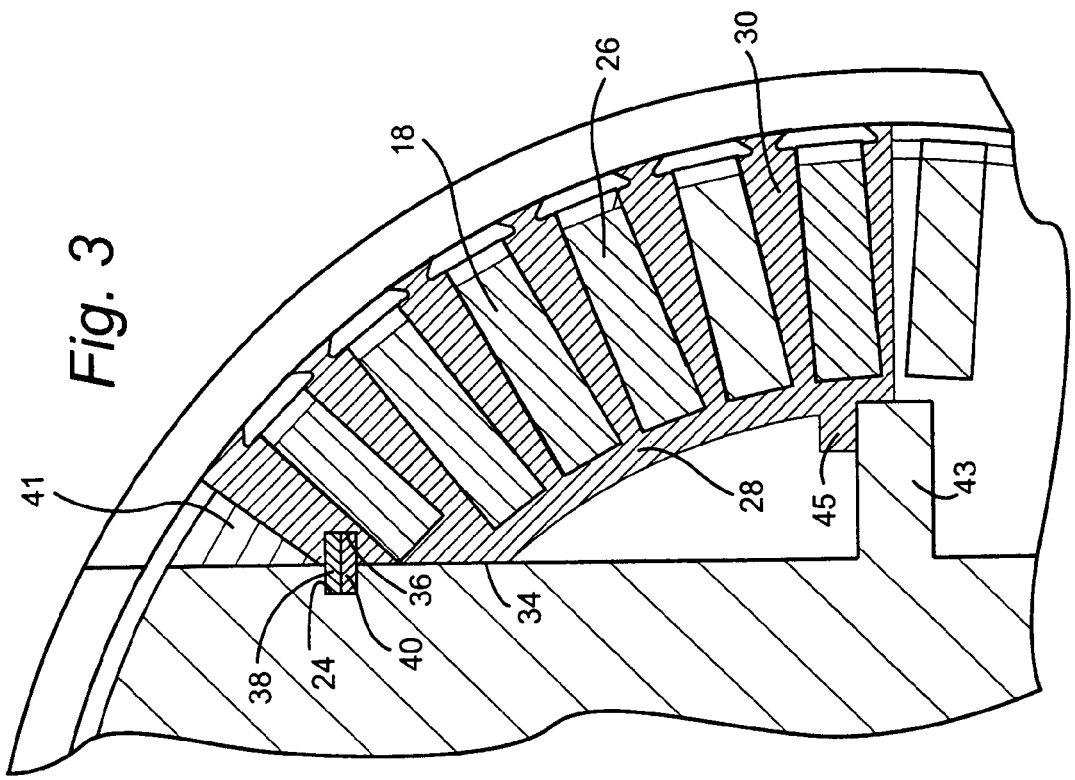
FIG. 3 is a fragmentary cross-sectional end view through the rotor illustrating locking strips in the locking grooves securing the modules to the rotor body.
Figure 2:
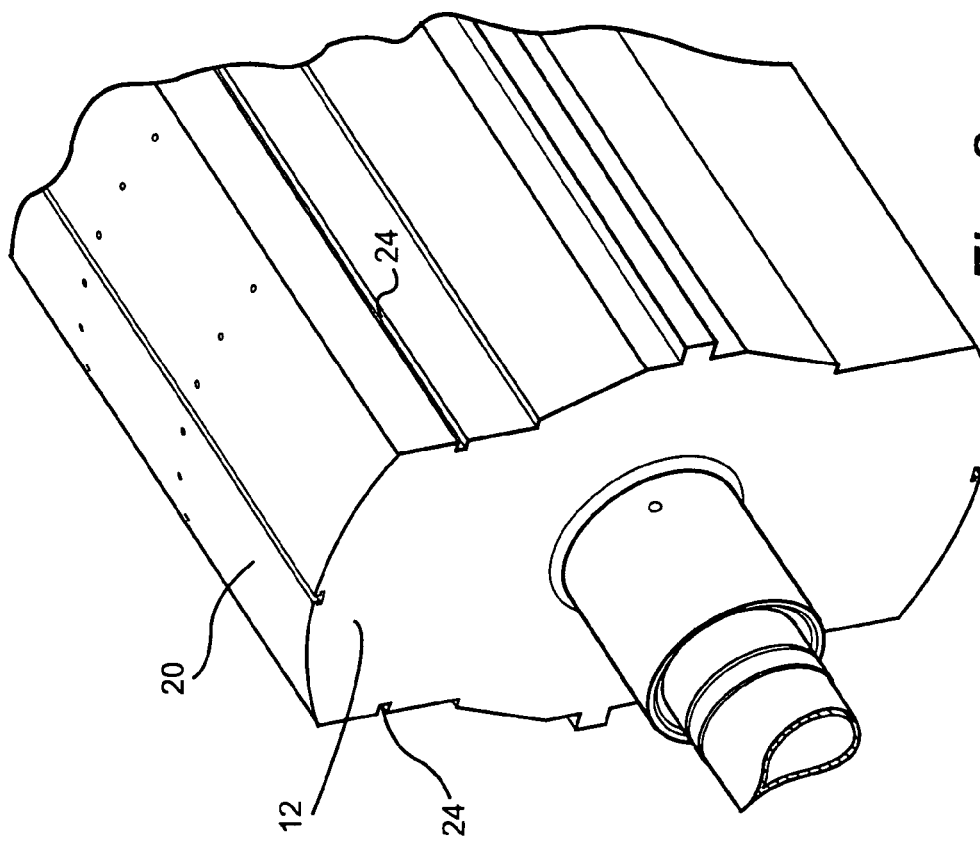
FIG. 2 is a fragmentary perspective view of the rotor illustrating an axial locking slot.

There is illustrated in FIG. 1 a portion of an electrical machine, generally designated 10, including a rotor 12 comprised of a multi-pole magnetic core 14 (a two-pole core being shown) and including spindles 16 at opposite rotor ends. The rotor 12 receives a plurality of modular windings 18, one for each pole. The pole faces 20 of the rotor are arcuate and have generally parallel sides 22. As illustrated, each modular winding 18 (module) is slidable over the parallel sides 22 of the rotor. The modular windings 18 are curved in arcs at their opposite ends to lie in partial concentricity about the spindles 16. In final position on the rotor 12, the axially extending windings between the end arcs essentially have outer arcuate surfaces forming continuations of the arcuate pole faces 20. A portion of the rotor is illustrated in FIG. 2 and includes on each of the generally parallel sides straddling the pole faces 20 an axial locking groove 24 forming part of a system for anchoring the modular windings 18 to the rotor 12. A portion of a modular winding 18 is illustrated in FIG. 3 and includes a plurality of axially extending field windings 26 and axially spaced winding supports or braces 28. The winding braces 28 include a plurality of circumferentially and axially spaced, generally radially outwardly projecting elements 30 defining spaces circumferentially therebetween for receiving the modular field winding 26. The winding braces 28 have linear extending interior faces 34 which lie in opposition with the parallel sides 22 of the rotor upon final assembly. Additionally, the winding braces 28 also include slots 36 along their interior faces 34. The field windings 18 are secured to the rotor by the cooperation of a pair of locking strips 38 and 40 (FIG. 2) superposed one over the other and extending within the axial groove 24 of the rotor and the slot 36 of the winding module 18.

The modules are assembled in a radial inward direction onto the rotor 12. An opening appears between each side of the pole face and a pole side of the support brace upon assembly. A magnetic wing 41 is disposed in the opening enabling magnetic flux dispersal at the rotor surface. Also, in FIG. 3, the side of the pole face includes a flange 43 and each module has a stop 45. Stop 45 engages flange 43 upon radial insertion of the module onto the rotor to position the module about the rotor.

Figure 5:
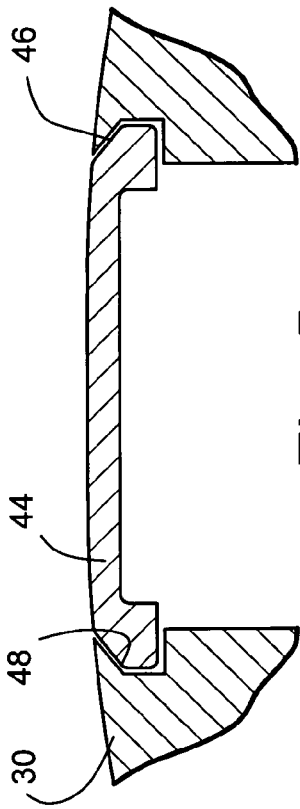
FIG. 5 is a cross-sectional view of a filler strip and a dovetail connection between the filler strip and ends of the support elements of the support brace.
Figure 6:
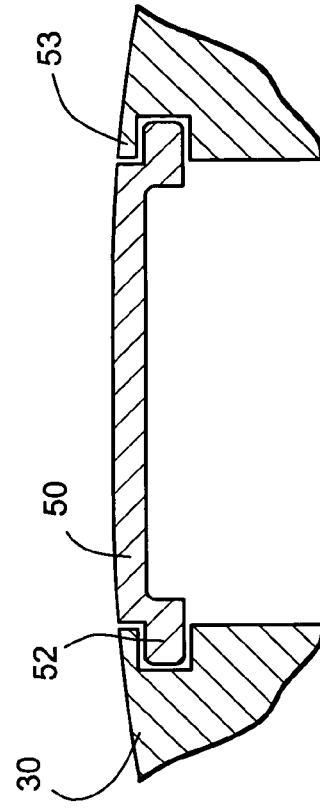
FIG. 6 is a view similar to FIG. 5 illustrating a tongue-and-groove connection between the filler strip and the support elements.
Figure 4:
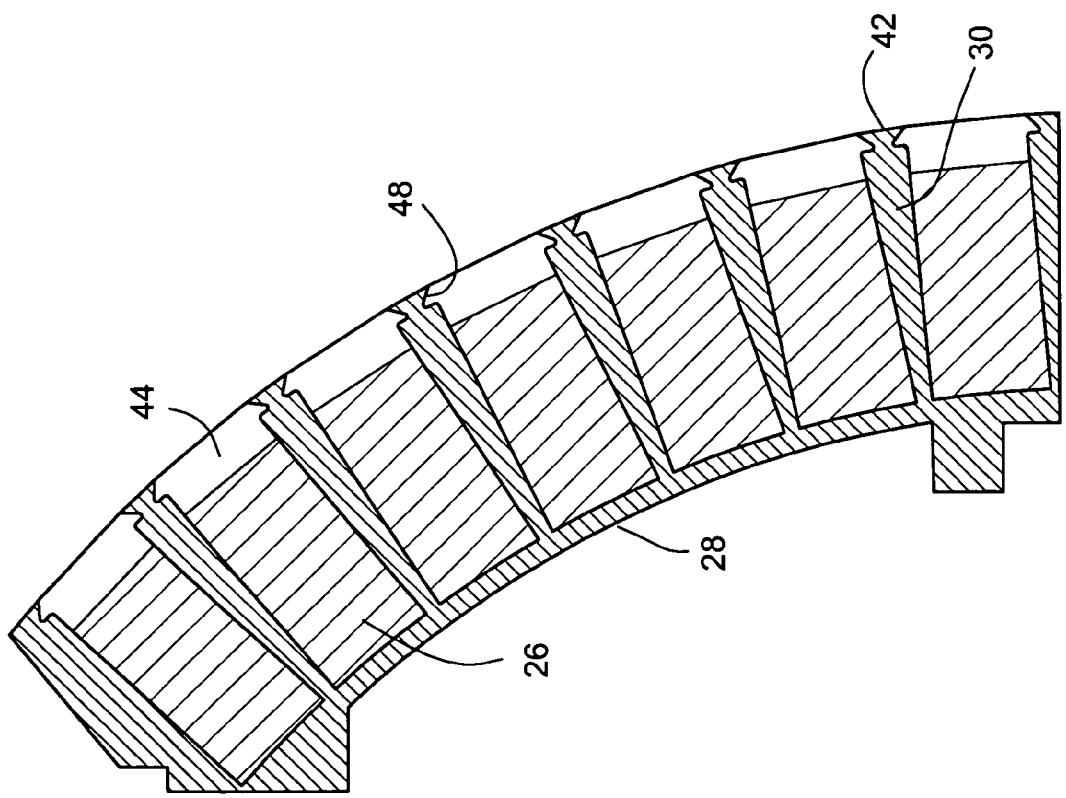
FIG. 4 is an end view of a support brace.

The winding support brace 28 includes radially projecting support elements 30 (FIGS. 4–6) which terminate at their radial outer ends in arcuate surfaces 42 forming a continuation of the cylindrical outer surface portion of the module. Filler strips 44 are interconnected to the outer ends of adjacent pairs of support elements 30 to secure the windings 26 in place during assembly and operation and in a manner to maintain electrical creepage paths to a minimum. Filler strips 44 are formed of a non-conductive material comprising one of a fiber composite laminate or a powder-coated metal. The filler strips 44 are interlocked with the adjacent pairs of support elements 30. For example, as illustrated in FIG. 5, the filler strip 44 is elongated and has tapered lateral edges 46. The adjacent pairs of support elements 30 include complementary tapered edges 48. Consequently, it will be appreciated that the filler strips 44 may be interlocked with the support elements 30 by a dovetail connection. A tongue-and-groove connection may be provided between the filler strips 50 and the outer ends of the support elements 30. In this form illustrated in FIG. 6, the filler strips 50 may have a lateral tongue 52 adjacent each elongated side edge of the filler strip which is received under a corresponding tongue 53 formed along the outer edges of the support elements 30. It will be appreciated in both cases that the filler strips 44 and 50 in conjunction with the support elements have outer surfaces which form a continuous arcuate configuration forming part of a cylindrical outer surface of the rotor.

Figure 7:
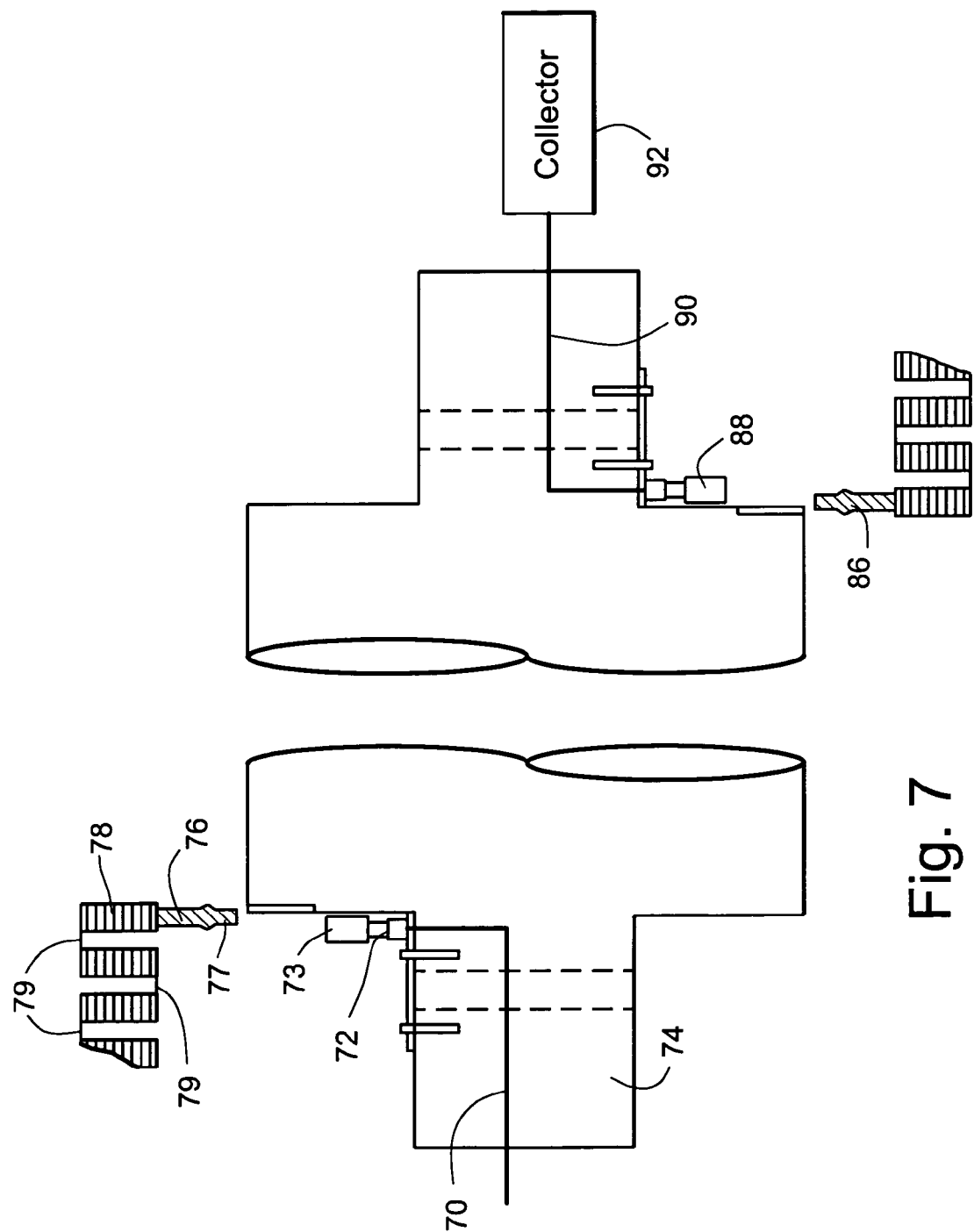
FIG. 7 is a fragmentary schematic illustration of plug-in type connectors between the rotor body and the modules.

The electrical connection between the rotor body and the modules is schematically illustrated in FIG. 7. A main lead 70 carried by the rotor body is suitably connected to a power source external to the rotor body. The main lead 70 terminates in a radial extending connector 72 carried on the spindle 74 adjacent the end face of the pole region of the rotor. Preferably, the connector 72 is of the multi-lam type having a female connector or socket 73 mounted on the spindle 74. As illustrated, the male connector 76 having a male plug-in connector 77 is mounted to the innermost end coil 78 of a first winding module and extends in a generally radial direction for connection with the radially oriented connector 72. The coils which form the end turns of the modules are interconnected one with the other alternatively along their outer and inner windings as indicated at 79.

The windings of the first module terminate in an electrical connector 80 (FIG. 8) disposed along a pole face. The adjacent module includes a mating electrical connector 82.

Preferably, the electrical connectors 80 and 82 are of the multi-lam type with male and female plug-in electrical connections 81 and 83, respectively, being made upon radial displacement of one module toward the other. FIG. 8 illustrates a pair of connections between the top and bottom modules. However, only one connection is necessary to complete the series circuit between the modules. The second or last electrically connected module includes a further electrical connector 86 which couples with a mating electrical connector 88 (FIG. 7) on the rotor 12, in turn connected to an electrical lead 90. The electrical connectors 86 and 88 are plug-in male and female-type connectors (similarly as previously described) which couple with one another in response to radial inward movement of one of the modules relative to the other module. The lead 90 is coupled to a collector 92 through suitable connections such as brushes. It will thus be appreciated that a series circuit is completed through the winding modules and rotor body.

The plug-in type connections between the rotor body and the modules and between the modules themselves enable the modules to be secured to the rotor body without additional brazing at the pole connection end of the winding. Thus, the plug-in connections extending in radial directions oriented parallel to the direction of motion of the modules facilitate assembly of the modules onto the rotor body and the formation of the electrical connections between the rotor body and modules and the modules with one another.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A multi-pole electric machine rotor comprising:
   a rotor body having defined pole regions with pole faces and sides adjacent the pole faces;
   at least a pair of prefabricated winding modules each having sequentially abutting field windings, said modules being fitted over the sides of the pole regions;
   each said module including a winding support having generally radially extending circumferentially spaced support elements defining slots therebetween for receiving the field windings;
   filler strips radially outwardly of said windings in each said slot and secured between radially outer ends of adjacent pairs of said support elements; and
   said rotor body has a flange projecting perpendicular to a center line of the poles, each said module having a stop for engaging against said flange to position the modules about the rotor body.

2. A rotor according to claim 1 wherein said filler strips and said adjacent pairs of support elements have a tongue-and-groove connection therebetween.

3. A rotor according to claim 1 wherein said filler strips and said adjacent pairs of support elements have dovetail connections therebetween.

4. A rotor according to claim 1 wherein said filler strips and said support elements have aligned arcuate outer surfaces forming portions of a generally cylindrical surface about the rotor.

5. A rotor according to claim 1 wherein each side of the pole face and a pole side of a support element define an opening therebetween and a magnetic wing disposed in said opening enabling magnetic flux dispersal at the rotor surface.

6. A rotor according to claim 1 wherein said support elements are axially and circumferentially spaced from one another, defining generally radially outwardly extending cooling paths between the windings.

7. A rotor according to claim 1 wherein said support elements are formed of non-conductive material comprising one of a fiber composite laminate or a powder-coated metal.

* * * * *